(12) United States Patent
Hesch et al.

(10) Patent No.: US 10,073,531 B2
(45) Date of Patent: Sep. 11, 2018

(54) ELECTRONIC DEVICE POSE IDENTIFICATION BASED ON IMAGERY AND NON-IMAGE SENSOR DATA

(71) Applicant: Google Inc., Mountain View, CA (US)

(72) Inventors: Joel Hesch, Mountain View, CA (US); Esha Nerurkar, Mountain View, CA (US)

(73) Assignee: Google LLC, Mountain View, CA (US)

( * ) Notice: Subject to any disclaimer, the term of this patent is extended or adjusted under 35 U.S.C. 154(b) by 231 days.

(21) Appl. No.: 14/877,038

(22) Filed: Oct. 7, 2015

(65) Prior Publication Data

US 2017/0102772 A1    Apr. 13, 2017

(51) Int. Cl.
```
G06F 3/01      (2006.01)
H04N 5/232     (2006.01)
G01P 15/09     (2006.01)
G01P 15/093    (2006.01)
```

(52) U.S. Cl.
CPC ............ *G06F 3/017* (2013.01); *G01P 15/093* (2013.01); *H04N 5/23229* (2013.01)

(58) Field of Classification Search
CPC .... G06F 3/017; G01P 15/093; H04N 5/23229
See application file for complete search history.

(56) References Cited

U.S. PATENT DOCUMENTS

| | | | |
|---|---|---|---|
| 2009/0285450 A1 | 11/2009 | Kaiser | |
| 2012/0086725 A1* | 4/2012 | Joseph | G06F 3/038 345/629 |
| 2012/0148224 A1 | 6/2012 | Poaniansky et al. | |
| 2013/0064427 A1* | 3/2013 | Picard | G01S 5/163 382/103 |
| 2014/0206443 A1 | 7/2014 | Sharp et al. | |

(Continued)

FOREIGN PATENT DOCUMENTS

| | | |
|---|---|---|
| WO | 2011128766 | 10/2011 |
| WO | 2014076294 | 5/2014 |

OTHER PUBLICATIONS

Samuele Salti and Luigi Di Stefano, "SVR-Based Jitter Reduction For Markerless Augmented Reality", http://vision.deis.unibo.it/ssalti/papers/Salti-ICIAP09.pdf, accessed May 29, 2015, 10 pages.

(Continued)

*Primary Examiner* — Jason A Flohre (57) ABSTRACT

An electronic device includes one or more imaging sensors (e.g, imaging cameras) and includes one or more non-image sensors, such as an inertial measurement unit (IMU), that can provide information indicative of the pose of the electronic device. The electronic device estimates its pose based on two independent sources of pose information: pose information generated at a relatively high rate based on non-visual information generated by the non-image sensors and pose information generated at a relatively low rate based on imagery captured by the one or more imaging sensors. To achieve both a high pose-estimation rate and high degree of pose estimation accuracy, the electronic device adjusts a pose estimate based on the non-visual pose information at a high rate, and at a lower rate spatially smoothes the pose estimate based on the visual pose information.

16 Claims, 6 Drawing Sheets

(56) References Cited

U.S. PATENT DOCUMENTS

| | | | |
|---|---|---|---|
| 2014/0240464 A1* | 8/2014 | Lee | G01S 17/08 |
| | | | 348/47 |
| 2014/0341474 A1 | 11/2014 | Dollar et al. | |
| 2014/0369557 A1 | 12/2014 | Kayombya et al. | |
| 2014/0375493 A1* | 12/2014 | Weisenburger | G01S 19/48 |
| | | | 342/357.3 |
| 2015/0098614 A1 | 4/2015 | Gee et al. | |
| 2015/0142378 A1 | 5/2015 | Hebert et al. | |
| 2015/0193949 A1* | 7/2015 | Katz | G02B 27/017 |
| | | | 345/8 |
| 2015/0219767 A1* | 8/2015 | Humphreys | G01S 19/43 |
| | | | 342/357.26 |

OTHER PUBLICATIONS

Ankur Agarwal and Bill Triggs, "Recovering 3D Human Pose From Monocular Images" IEEE Transactions on Pattern Analysis and Machine Intelligence, Institute of Electrical and Electronics Engineers (IEEE), 2006, pp. 44-58.

E. Murphy-Chutorian and M.M. Trivedi, "Head Pose Estimation and Augmented Reality Tracking: An Integrated System and Evaluation for Monitoring Driver Awareness", IEEE Transactions on Intelligent Transportation Systems, vol. 11, No. 2, Jun. 2010, pp. 300-311.

International Search Report and Written Opinion correlating to PCT/US16/053081 dated Dec. 7, 2016, 13 pages.

International Preliminary Report on Patentability dated Apr. 19, 2018 for PCT Application No. PCT/US2016/053081, 9 pages.

* cited by examiner

ELECTRONIC DEVICE POSE IDENTIFICATION BASED ON IMAGERY AND NON-IMAGE SENSOR DATA

FIELD OF THE DISCLOSURE

The present disclosure relates generally to imagery capture and processing and more particularly to machine vision using captured imagery.

BACKGROUND

Machine vision and display techniques, such as simultaneous localization and mapping (SLAM), augmented reality (AR), and virtual reality (VR), often rely on the identification of objects within the local environment of a device through the analysis of imagery of the local environment captured by the device. To support these techniques, the device frequently includes hardware to identify a pose (a position and orientation) of the device. However, conventional techniques for identifying a device pose typically take a relatively significant amount of time, thereby limiting the utility and effectiveness of the machine vision techniques. For example, a relatively long delay in identifying the device pose can cause a mismatch between the actual pose of the device and displayed AR or VR content. In turn, this mismatch can cause a user of the device to experience disorientation or discomfort.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

DETAILED DESCRIPTION OF EMBODIMENTS

The following description is intended to convey a thorough understanding of the present disclosure by providing a number of specific embodiments and details involving the determination of a relative position or relative orientation of an electronic device based on image-based identification of objects in a local environment of the electronic device. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-7 illustrate various techniques for the estimation of a pose of an electronic device within a local environment so as to support location-based functionality, such as augmented reality (AR) functionality, virtual reality (VR) functionality, visual localization/odometry or other simultaneous localization and mapping (SLAM) functionality, and the like. The term "pose" is used herein to refer to either or both of position (also referred to as a location) and orientation (also referred to as a point of view). In some embodiments, the electronic device includes one or more imaging sensors (e.g, imaging cameras) and includes one or more non-image sensors, such as an inertial measurement unit (IMU), that can provide information indicative of the pose of the electronic device. In at least one embodiment, the electronic device estimates its pose based on two independent sources of pose information: pose information generated at a relatively high rate based on non-visual information generated by the non-image sensors (referred to as "non-visual pose information"), and a pose information (referred to as "visual pose information") generated at a relatively low rate based on imagery captured by the one or more imaging sensors (referred to for purposes of description as "visual pose information"). The visual pose information typically provides more accurate or refined pose information at the electronic device, but generally is not generated quickly enough to support a satisfying user experience with the location-based functionality. Conversely, the non-visual pose information is generated quickly but may not be accurate enough to support a satisfying user experience. Accordingly, to achieve both a high pose-estimation rate and high degree of pose estimation accuracy, the electronic device adjusts a pose estimate based on the non-visual pose information at a high rate, and at a lower rate spatially smoothes the pose estimate based on the visual pose information.

To illustrate, in at least one embodiment the electronic device identifies an initial pose based on visual pose information, non-visual pose information, or a combination thereof. As the pose of the device changes due to, for example, user movement, the non-image sensors generate non-visual pose information indicative of the pose changes. Based on this non-visual pose information, the electronic device adjusts the estimated pose. However, inaccuracies in the non-visual pose information can, over time, cause errors, or "drift," in the estimated pose, which in turn can cause errors in the location-based functionality of the electronic device. For example, errors in the visual pose information can cause misalignment of displayed objects, environments, or overlays in a VR or AR application. To reduce or eliminate such errors, the electronic device implements a drift correction process by periodically adjusting the estimated pose based on the visual pose information. For example, the visual pose information may indicate that the most recent estimated pose for the electronic device, as generated based on recent non-visual pose information, is incorrect along a particular axis of a frame of reference for the electronic device. In response, the electronic device adjusts the most recent estimated pose along this axis, thereby improving the accuracy of the estimated pose. In this way, the electronic device spatially smoothes the estimated pose based on the visual pose information, thereby achieving both improved pose accuracy and high-rate pose identification.

Figure 1:
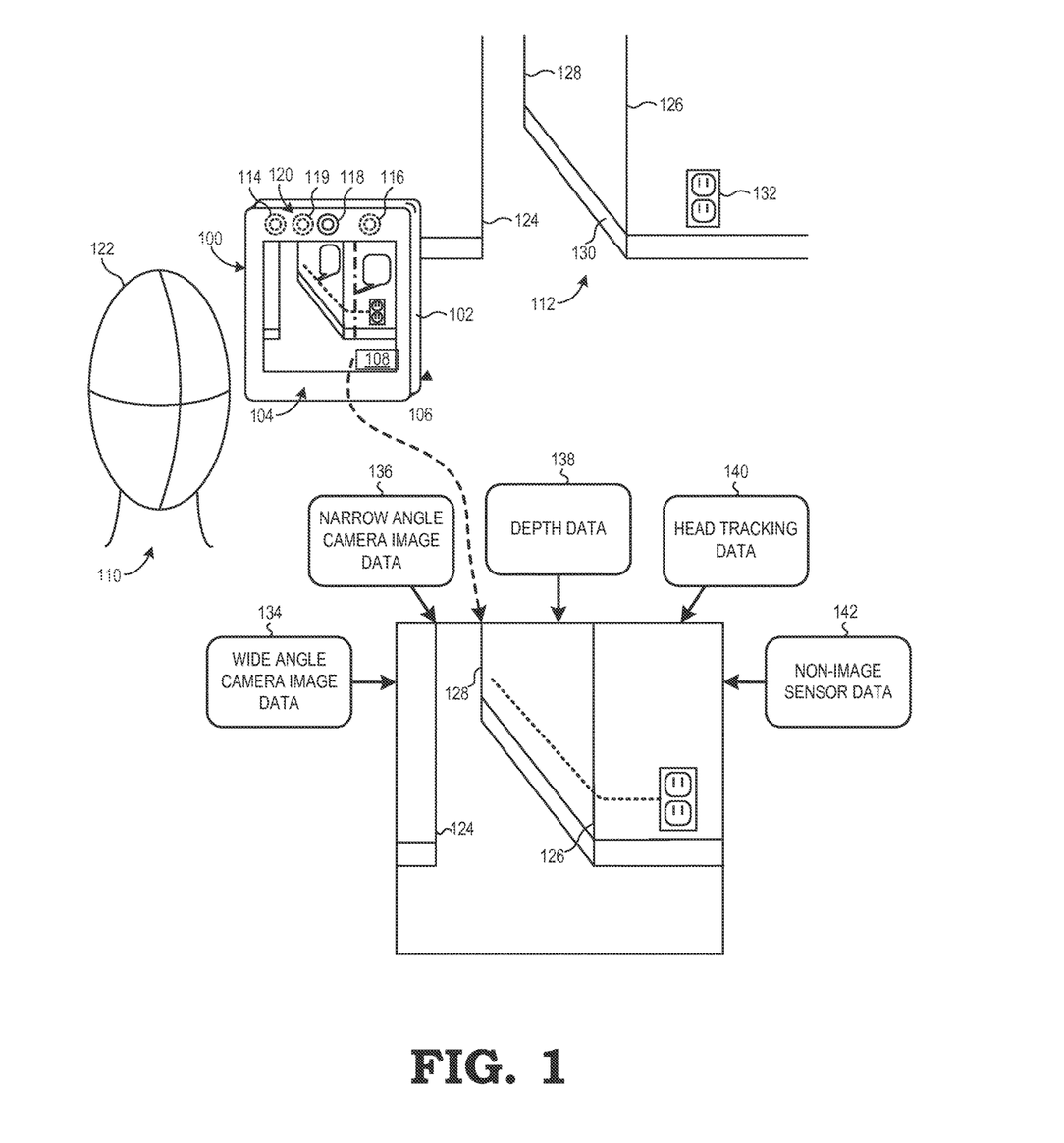
FIG. 1 is a diagram illustrating an electronic device configured to estimate a pose of an electronic device in a local environment using pose information generated at a first rate based on non-image sensor data and pose information generated at a second, slower rate using image sensor data in accordance with at least one embodiment of the present disclosure.

FIG. 1 illustrates an electronic device 100 configured to support location-based functionality, such as SLAM, VR, or AR, using image and non-image sensor data in accordance with at least one embodiment of the present disclosure. The electronic device 100 can include a user-portable mobile device, such as a tablet computer, computing-enabled cellular phone (e.g., a "smartphone"), a notebook computer, a personal digital assistant (PDA), a gaming system remote, a television remote, and the like. In other embodiments, the electronic device 100 can include another type of mobile device, such as an automobile, remote-controlled drone or other airborne device, and the like. For ease of illustration, the electronic device 100 is generally described herein in the example context of a mobile device, such as a tablet computer or a smartphone; however, the electronic device 100 is not limited to these example implementations.

In the depicted example, the electronic device 100 includes a housing 102 having a surface 104 opposite another surface 106. In the example thin rectangular block form-factor depicted, the surfaces 104 and 106 are substantially parallel and the housing 102 further includes four side surfaces (top, bottom, left, and right) between the surface 104 and surface 106. The housing 102 may be implemented in many other form factors, and the surfaces 104 and 106 may have a non-parallel orientation. For the illustrated tablet implementation, the electronic device 100 includes a display 108 disposed at the surface 106 for presenting visual information to a user 110. Accordingly, for ease of reference, the surface 106 is referred to herein as the "forward-facing" surface and the surface 104 is referred to herein as the "user-facing" surface as a reflection of this example orientation of the electronic device 100 relative to the user 110, although the orientation of these surfaces is not limited by these relational designations.

The electronic device 100 includes a plurality of sensors to obtain information regarding a local environment 112 of the electronic device 100. The electronic device 100 obtains visual information (imagery) for the local environment 112 via imaging cameras 114 and 116 and a depth sensor 120 disposed at the forward-facing surface 106 and an imaging camera 118 disposed at the user-facing surface 104. In one embodiment, the imaging camera 114 is implemented as a wide-angle imaging camera having a fish-eye lens or other wide-angle lens to provide a wider angle view of the local environment 112 facing the surface 106. The imaging camera 116 is implemented as a narrow-angle imaging camera having a typical angle of view lens to provide a narrower angle view of the local environment 112 facing the surface 106. Accordingly, the imaging camera 114 and the imaging camera 116 are also referred to herein as the "wide-angle imaging camera 114" and the "narrow-angle imaging camera 116," respectively. As described in greater detail below, the wide-angle imaging camera 114 and the narrow-angle imaging camera 116 can be positioned and oriented on the forward-facing surface 106 such that their fields of view overlap starting at a specified distance from the electronic device 100, thereby enabling depth sensing of objects in the local environment 112 that are positioned in the region of overlapping fields of view via image analysis. The imaging camera 118 can be used to capture image data for the local environment 112 facing the surface 104. Further, in some embodiments, the imaging camera 118 is configured for tracking the movements of the head 122 or for facial recognition, and thus providing head tracking information that may be used to adjust a view perspective of imagery presented via the display 108.

The depth sensor 120, in one embodiment, uses a modulated light projector 119 to project modulated light patterns from the forward-facing surface 106 into the local environment, and uses one or both of imaging cameras 114 and 116 to capture reflections of the modulated light patterns as they reflect back from objects in the local environment 112. These modulated light patterns can be either spatially-modulated light patterns or temporally-modulated light patterns. The captured reflections of the modulated light patterns are referred to herein as "depth imagery." The depth sensor 120 then may calculate the depths of the objects, that is, the distances of the objects from the electronic device 100, based on the analysis of the depth imagery. The resulting depth data obtained from the depth sensor 120 may be used to calibrate or otherwise augment depth information obtained from image analysis (e.g., stereoscopic analysis) of the image data captured by the imaging cameras 114 and 116. Alternatively, the depth data from the depth sensor 120 may be used in place of depth information obtained from image analysis. To illustrate, multiview analysis typically is more suited for bright lighting conditions and when the objects are relatively distant, whereas modulated light-based depth sensing is better suited for lower light conditions or when the observed objects are relatively close (e.g., within 4-5 meters). Thus, when the electronic device 100 senses that it is outdoors or otherwise in relatively good lighting conditions, the electronic device 100 may elect to use multiview analysis to determine object depths. Conversely, when the electronic device 100 senses that it is indoors or otherwise in relatively poor lighting conditions, the electronic device 100 may switch to using modulated light-based depth sensing via the depth sensor 120.

The electronic device 100 also may rely on non-image pose information for pose detection. This non-image pose information can be obtained by the electronic device 100 via one or more non-image sensors (not shown in FIG. 1), such as an IMU including one or more gyroscopes, magnetometers, and accelerometers. In at least one embodiment, the IMU can be employed to generate pose information along multiple axes of motion, including translational axes, expressed as X, Y, and Z axes of a frame of reference for the electronic device 100, and rotational axes, expressed as roll, pitch, and yaw axes of the frame of reference for the electronic device 100. The non-image sensors can also include ambient light sensors and location sensors, such as GPS sensors, or other sensors that can be used to identify a location of the electronic device 100, such as one or more wireless radios, cellular radios, and the like. The non-image sensors also can include user interface components, such as a keypad (e.g., touchscreen or keyboard), microphone, mouse, and the like.

In operation, the electronic device 100 uses the image sensor data and the non-image sensor data to estimate a pose of the electronic device 100. In at least one embodiment, after a reset the electronic device 100 determines an initial pose based on geolocation data, other non-visual sensor data, visual sensor data as described further below, or a combination thereof. As the pose of the electronic device 100 changes, the non-visual sensors generate, at a relatively high rate, non-visual pose information reflecting the changes in the device pose. Concurrently, the visual sensors capture images that also reflect device pose changes. Based on this non-visual and visual pose information, the electronic device 100 updates the initial pose to reflect a current pose of the device.

The electronic device 100 generates visual pose information based on the detection of spatial features in image data captured by one or more of the imaging cameras 114, 116, and 118. To illustrate, in the depicted example of FIG. 1 the local environment 112 includes a hallway of an office building that includes three corners 124, 126, and 128, a baseboard 130, and an electrical outlet 132. The user 110 has positioned and oriented the electronic device 100 so that the forward-facing imaging cameras 114 and 116 capture wide angle imaging camera image data 134 and narrow angle imaging camera image data 136, respectively, that includes these spatial features of the hallway. In this example, the depth sensor 120 also captures depth data 138 that reflects the relative distances of these spatial features relative to the current pose of the electronic device 100. Further, the user-facing imaging camera 118 captures image data representing head tracking data 140 for the current pose of the head 122 of the user 110. Non-image sensor data 142, such as readings from the IMU, also is collected by the electronic device 100 in its current pose.

From this input data, the electronic device 100 can determine an estimate of its relative pose without explicit absolute localization information from an external source. To illustrate, the electronic device 100 can perform analysis of the wide angle imaging camera image data 134 and the narrow angle imaging camera image data 136 to determine the distances between the electronic device 100 and the corners 124, 126, 128. Alternatively, the depth data 138 obtained from the depth sensor 120 can be used to determine the distances of the spatial features. From these distances the electronic device 100 can triangulate or otherwise infer its relative position in the office represented by the local environment 112. As another example, the electronic device 100 can identify spatial features present in one set of captured images of the image data 134 and 136, determine the initial distances to these spatial features, and then track the changes in position and distances of these spatial features in subsequent captured imagery to determine the change in pose of the electronic device 100 in a free frame of reference. In this approach, certain non-image sensor data, such as gyroscopic data or accelerometer data, can be used to correlate spatial features observed in one image with spatial features observed in a subsequent image.

The electronic device 100 generates feature descriptors for the spatial features identified in the captured imagery. Each of the generated feature descriptors describes the orientation, gravity direction, scale, and other aspects of one or more of the identified spatial features. The generated feature descriptors are compared to a set of stored descriptors (referred to for purposes of description as "known feature descriptors") that each identifies previously identified spatial features and their corresponding poses. In at least one embodiment, each of the known feature descriptors is a descriptor that has previously been generated, and its pose definitively established, by either the electronic device 100 or another electronic device. The known feature descriptors can be stored at the electronic device 100, at a remote server or other storage device, or a combination thereof. Accordingly, the comparison of the generated feature descriptors can be performed at the electronic device 100, at the remote server or other device, or a combination thereof.

In at least one embodiment a generated feature descriptor is compared to a known feature descriptor by comparing each aspect of the generated feature descriptor (e.g. the orientation of the corresponding feature, the scale of the corresponding feature, and the like) to the corresponding aspect of the known feature descriptor and determining an error value indicating the variance between the compared features. Thus, for example, if the orientation of feature in the generated feature descriptor is identified by a vector A, and the orientation of the feature in the known feature descriptor is identified by a vector B, the electronic device 100 can identify an error value for the orientation aspect of the feature descriptors by calculating the difference between the vectors A and B. The error values can be combined according to a specified statistical technique, such as a least squares technique, to identify a combined error value for each known feature descriptor being compared, and the matching known feature descriptor identifies as the known feature descriptor having the smallest combined error value.

Each of the known feature descriptors includes one or more fields identifying the pose (e.g., the orientation or point of view) of the corresponding spatial feature. Thus, a known feature descriptor can include pose information indicating the location of the spatial feature within a specified coordinate system (e.g. a geographic coordinate system representing Earth) within a specified resolution (e.g. 1 cm), the orientation of the point of view of the spatial feature, the distance of the point of view from the feature and the like. The generated feature descriptors are compared to the known feature descriptors to identify one or more matched known feature descriptors. The matched known feature descriptors are then used to identify a pose of the electronic device 100.

In some scenarios, the matching process will identify multiple known feature descriptors that match corresponding generated feature descriptors, thus indicating that there are multiple features in the local environment of the electronic device 100 that have previously been identified. The corresponding poses of the matching known feature descriptors may vary, indicating that the electronic device 100 is not in a particular one of the poses indicated by the matching known feature descriptors. Accordingly, the electronic device 100 may refine its estimated pose by interpolating its pose between the poses indicated by the matching known feature descriptors using conventional interpolation techniques.

In at least one embodiment, the generated feature descriptors are not compared to all available known feature descriptors, but instead to a subset of the available known feature descriptors identified based on the estimated pose of the electronic device 100. For example, the subset of known feature descriptors can be identified as those within a specified distance of the pose of one of the generated feature descriptors. This limits the number of known feature descriptors for matching, thereby speeding up the matching process.

In at least one embodiment, the processing and communication overhead for identifying features based on captured imagery is such that the electronic device 100 can generate visual pose information at relatively low rate, such as 10 Hz or less, where the rate indicates the number of estimates of a pose generated each second. This rate is not sufficient to support a satisfying user experience for some location-based functionality. In contrast to the visual pose information, the electronic device 100 can generate non-visual pose information based on the IMU data and other non-visual information, at a relatively high rate, such as 1 kHz or greater. Accordingly, to achieve a high rate of pose identification while maintaining accuracy, the electronic device 100 employs both non-visual pose information and visual pose information to update its current pose.

To illustrate, the electronic device 100 can generate and update two different data structures of information, referred to as frames, to estimate its pose: a visualization frame and an estimator frame, wherein each type of frame stores a current estimate of the pose of the electronic device based on different sources of pose information. To wit, the visualization frame is frequently updated based on pose information generated by the IMU, while the estimator frame is updated less frequently based on the identification of features in captured imagery, as described above. The electronic device 100 periodically compares the estimator frame to the visualization frame and adjusts the visualization frame so that it matches, or is closer to, the estimator frame, thereby improving the accuracy of the visualization frame. The visualization frame thus reflects the estimated pose of the electronic device 100 based on both the frequently updated non-visual pose information and the less-frequently updated non-visual pose information. The estimated pose reflected by the visualization frame is employed by the electronic device 100 to support location-based functionality, as described further herein.

To illustrate via an example, the visualization frame and the estimator frame can each include information indicating the estimated position of the electronic device 100 along each of six axes in a frame of reference, reflecting six degrees-of-freedom (6DoF) of the electronic device 100, such as X, Y, and Z translational axes and roll, pitch, and yaw rotational axes. The IMU and other non-visual sensors periodically, at the relatively high rate, generate pose information indicating updates to the device's position along these axes and, in response, the electronic device 100 updates the visualization frame. Concurrently, the electronic device 100 adjusts the estimator frame based on any pose changes indicated by features identified in captured imagery and corresponding non-image data, as described above. Periodically, such as at specified intervals or in response to a change in the estimator frame, the electronic device 100 compares the estimator frame with the visualization frame and adjusts the visualization frame to more closely match the estimator frame, thereby improving the accuracy of the visualization frame. For purposes of description, the adjustment of the visualization frame to more closely match the estimator frame is referred to as "attracting" the visualization frame to the estimator frame.

The electronic device 100 can attract the visualization frame to the estimator frame in a variety of ways. For example, in at least one embodiment the electronic device 100 adjusts the visualization frame so that it matches the estimator frame along all six of the axes in the frame of reference (that is, so that the X, Y, Z, pitch, roll, and yaw values of the visualization frame match the corresponding values of the estimator frame). In particular, the visualization frame and the estimator frame each represent the estimated pose of the electronic device 100 with coordinate values for each of the six axes, and the electronic device 100 ensures that the values for the visualization frame match the corresponding values for the estimator frame. For purposes of description, this adjustment is referred to as "snapping" the visualization frame to the estimator frame. However, in some scenarios snapping the visualization frame to the estimator frame can cause perceptible discontinuities in the location-based functionality that employs the device pose, such as objects in a VR environment appearing to "jump" from one location to another. Accordingly, in some embodiments rather than snapping the visualization frame to the estimator frame, the electronic device 100 attracts the visualization frame to the estimator frame by scaling the visualization frame along the axes that differ. This moves the values of the visualization frame closer to the corresponding values of the estimation frame without necessarily making those values equivalent. For example, in response to determining that the visualization frame differs from the estimator frame along the Y-axis (that is, that the Y coordinate of the visualization frame differs from the Y coordinate of the estimator frame), the electronic device 100 adjusts the Y coordinate of the visualization frame by a specified percentage, such as five percent, that is not likely to result in a perceptible discontinuity to a user of the electronic device 100. In some embodiments the electronic device 100 clamps the amount of adjustment of the visualization frame to a specified maximum to reduce the likelihood that the adjustment will be perceivable to the user. For example, in response to identifying that the estimator frame differs from the visualization frame along the roll axis by more than a specified maximum threshold, the electronic device 100 can adjust the visualization frame along the roll axis by the specified maximum.

In at least one embodiment, the electronic device 100 does not attract the visualization frame to the estimator frame along all six axes of the frame of reference, but instead selects a subset of those axes for attraction. The subset of axes can be selected based on any or all of a variety of criteria, such as a predicted likelihood that a user of the electronic device 100 will perceive pose errors along the subset of axes. For example, in some scenarios a user is likely to be more sensitive to inaccuracies along the Z axis, as that represents an inaccuracy in the user's perceived horizon. Accordingly, the electronic device 100 can attract the visualization frame to the estimator frame along the Z axis and refrain from attracting the visualization frame to the estimator frame along another axis, such as the X axis or the pitch axis. This allows the electronic device 100 to simply the attraction process, both speeding up the attraction and reducing the amount of pose changes that can be perceived by a user, improving the user experience. In some embodiments, the electronic device 100 selects one or more axes for attraction based on the amount of difference between the visualization frame and the estimator frame along each axis. Thus, for example, the electronic device 100 can select for attraction those axes that have the largest difference between the frames in order to provide the most improvement in accuracy for the visualization frame.

In some scenarios, the impact of pose errors on location-based functionality can depend on a degree of motion of the electronic device 100. Thus, for example, the more rapidly that the pose of the electronic device moves along a given axis of the frame of reference of the electronic device 100, the more likely that pose errors along that axis will have a deleterious impact on the location-based functionality.

Accordingly, in some embodiments the electronic device 100 selects, for attraction of the visualization frame to the estimator frame, those axes along which it detects a degree of motion that exceeds a threshold. For example, successive estimated poses may indicate that the degree of motion of the electronic device 100 along the X axis and the pitch axis exceeds a threshold amount, but the degree of motion along the other axes is less than the threshold amount. In response, the electronic device 100 attracts the visualization frame to the estimator frame only along the X axis and the pitch axes, and not the other axes.

The non-visual pose information provided by the IMU can indicate small changes in the pose of the electronic device 100 even when the device is stationary. Updating the visualization frame based on such changes could cause errors in the location-based functionality supported by the device pose. Accordingly, the electronic device 100 can "clamp" the visualization frame so that it is only updated when the position change indicated by the IMU exceeds a threshold value. That is, if the difference between the visualization frame and an estimated pose indicated by the IMU is less than a threshold amount, the electronic device 100 can refrain from updating the visualization frame. Further, in response to determining that the IMU pose information or visual pose information indicates that the electronic device 100 is stationary, the electronic device 100 can suppress or prevent attraction of the visualization frame to the estimator frame. This prevents the attraction from causing changes in the visualization frame, which could be perceived as motion in the location-based functionality of the electronic device 100.

The electronic device 100 identifies its pose based on the visualization frame, and uses the pose to enable or enhance its location-based functionality. For example, the pose can be employed to identify meshes or images that represent simplified representations of spatial features known to be in proximity to the refined pose. The meshes or images can be fed to an application executing at the electronic device 100 to enable augmented reality or other location-based functionality.

Figure 2:
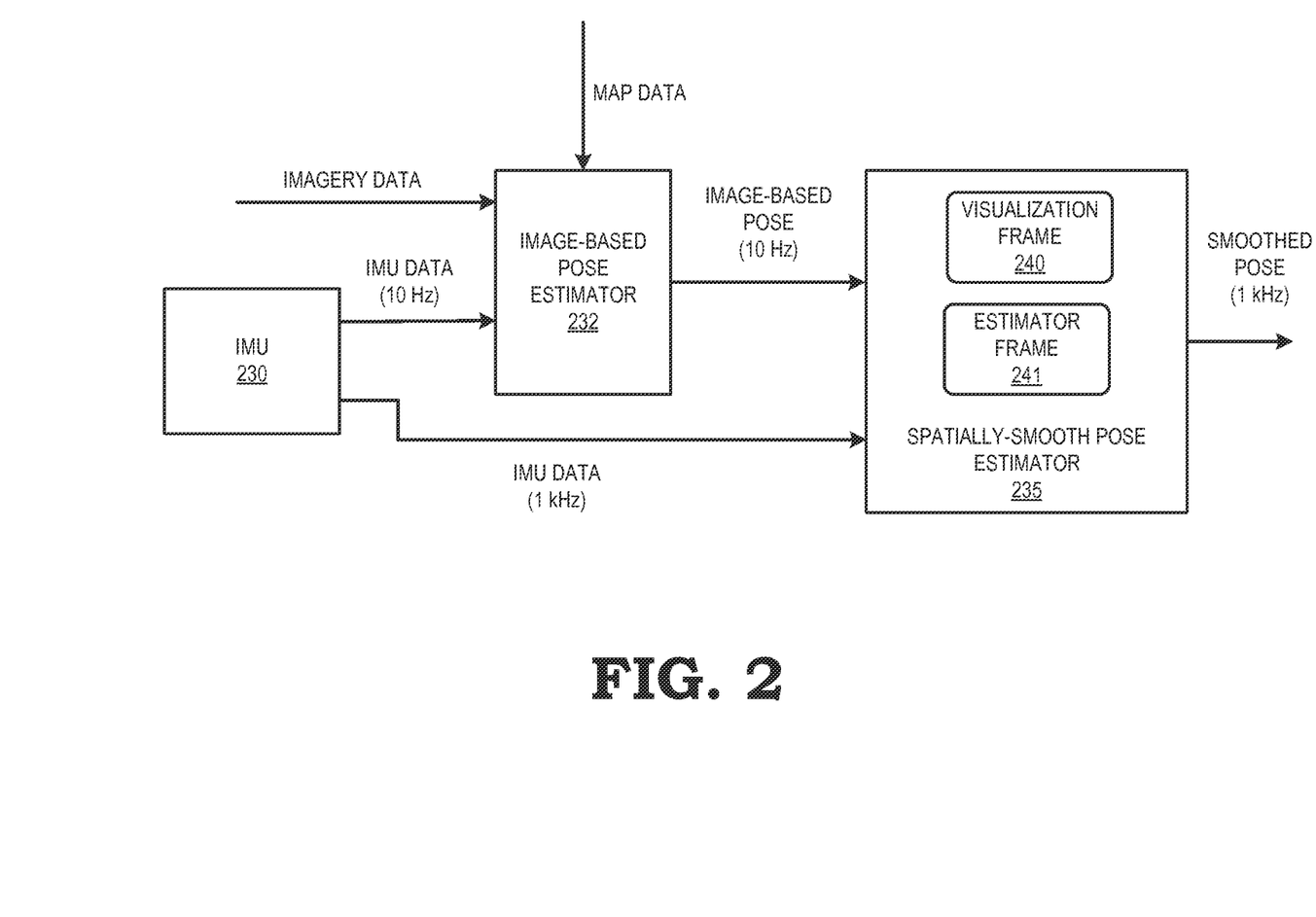
FIG. 2 is a diagram illustrating a portion of the electronic device of FIG. 1 that estimates a pose of the electronic device based on a combination of non-image sensor data collected at a relatively fast rate and pose information generated at a slower rate based on image sensor data in accordance with at least one embodiment of the present disclosure.

FIG. 2 is a block diagram of a portion of the electronic device 100 that identifies a pose of the device based on visual pose information and non-visual pose information in accordance with at least one embodiment of the present disclosure. In the illustrated example, the electronic device 100 includes an IMU 230 that includes one or more gyroscopes, magnetometers, and accelerometers that periodically (e.g., according to a clock signal that governs operations of the IMU 230) generates pose information indicative of a pose of the electronic device 100. In at least one embodiment, the IMU 230 is a device such as the Bosch Sensortec BMX055 IMU that can generate pose information indicative of a position and orientation along any of the 6 different axes of a 6DoF frame of reference for the electronic device 100. In the illustrated example, the IMU 230 generates pose information at 2 different rates: a 1 kHz rate and a 10 Hz rate. In at least one embodiment, the pose estimations at the slower rate are generated by the electronic device decimating or otherwise periodically selecting the pose estimations at the faster rate.

In the depicted example of FIG. 2, the electronic device 100 also includes two pose estimation modules: an image-based pose estimator 232 and a spatially smoothed based pose estimator 235. In at least one embodiment, these modules represent software modules executing at one or more processors of the electronic device 100 and hardware that supports in execution of the software modules. The image-based pose estimator 232 generates pose information, indicating an estimated pose for the electronic device 100 based on a combination of imagery data, map data such as geolocation data (e.g., GPS), and pose information generated by the IMU 230 at the 10 Hz rate. In at least one embodiment, the image-based pose estimator 232 generates visual-based pose information by identifying spatial features in the captured images as described above with respect to FIG. 1. Because of the relatively high amount of overhead required to identify the spatial features, the image-based pose estimator 232 generates the visual-based pose information at the relatively slow rate of 10 Hz.

The spatially-smooth pose estimator 235 generates at least two estimated poses, illustrated at FIG. 2 as visualization frame 240 and estimator frame 241. In at least one embodiment, the spatially-smooth pose estimator 235 updates the visualization frame based in response to new non-visual pose information being provided by the IMU 230. Thus, the spatially-smooth pose estimator 235 updates the visualization frame relatively frequently, up to the 1 kHz rate at which the IMU 230 provides non-visual pose information. Because of the frequency of the updates, the visualization frame provides, over time a spatially smooth estimated pose for the electronic device 100. To improve the accuracy of the visualization frame, the spatially-smooth pose estimator 235 employs the estimator frame 241. In particular, the spatially-smooth pose estimator 235 updates the estimator frame 241 based on the visual based pose information generated by the image-based pose estimator 232, and periodically attracts the visualization frame 240 to the estimator frame 241.

Figure 3:
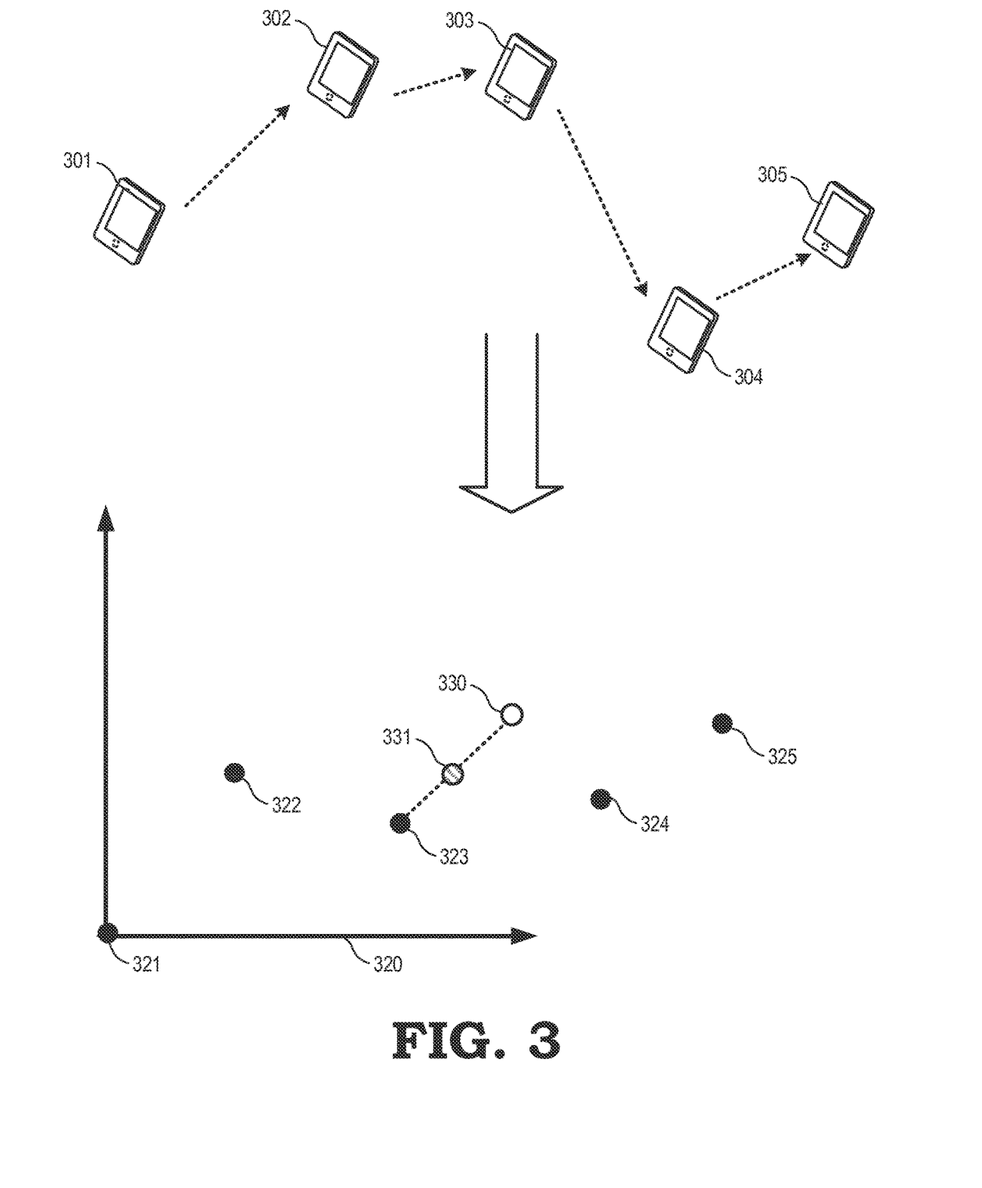
FIG. 3 is a diagram illustrating spatial smoothing of a set of estimated poses based on non-image sensor data using an estimated pose generated based on image sensor data in accordance with at least one embodiment of the present disclosure.

An example operation of the spatially-smooth pose estimator 235 is illustrated by FIG. 3, which depicts a pose 301 of the electronic device 100 corresponding to a reset or other initializing event at the electronic device 100, and further illustrates poses 302-304, corresponding to the sequence of poses of the electronic device 100 after pose 301 as the device is moved over time. Also illustrated is a frame of reference 320 for poses of the electronic device 100. For simplicity of description, the frame of reference 320 is illustrated and described as a two-dimensional frame of reference. However, it will be appreciated that in other embodiments the frame of reference 320 can be three-dimensional frames of reference, or higher-dimensional frames of reference that indicate both position and orientation, such as a 6 degree of freedom (DOF) frame of reference.

In the depicted example, in response to the reset event the spatially-smooth pose estimator 235 identifies an estimated pose 321, corresponding to pose 301 of the device. In at least one embodiment, this initial estimated pose 321 is generated by the image-based pose estimator 232 (FIG. 2) based on a combination of imagery captured by the electronic device 100, position information captured by the IMU 230, and map information such as GPS data. The spatially-smooth pose estimator 235 records this initial estimated pose as an initial state of the visualization frame 240. As the electronic device 100 is moved from pose 301 to pose 302, the IMU 230 provides non-visual pose information indicating the change in pose, and the electronic device 100 updates the visualization frame 240 based on the pose information, so that the visualization frame 240 reflects an estimated pose 322, corresponding to pose 302.

Similarly, as the electronic device 100 is moved from pose 302 to pose 303, the spatially-smooth pose estimator 235 updates the visualization frame 240 based on corresponding pose information provided by the IMU 230, so that the visualization frame 240 reflects an estimated pose 323. In addition, the image-based pose estimator 232 concurrently generates visual-based pose information based on identification of features according to a combination of captured imagery, pose information provided by the IMU, and map information, as described above. Based on this visual-based pose information, the spatially-smooth pose estimator 235 updates the estimator frame 241 so that it reflects an estimated pose 330. As illustrated in FIG. 3, the estimated pose 330 differs from the estimated pose 323, indicating that the visualization frame likely does not correctly reflect the pose 303 of the electronic device 100. Accordingly, the spatially smoothed pose estimator 235 attracts the visualization frame 240 to the estimator frame 241, so that the visualization frame 240 corresponds to an estimated pose 331 that more closely matches the pose 303. In the illustrated example, the visualization frame 240 is not snapped to the estimator frame 241, but instead is scaled towards the estimator frame 241 along both axes of the frame of reference 320. This scaling reduces the likelihood that attracting the visualization frame 240 to the estimator frame 241 will be perceptible to a user of location-based functionality at the electronic device 100.

As the electronic device 100 moves to poses 304 and 305, the spatially smoothed pose estimator 235 updates the visualization frame 240, based on pose information received from the IMU 230, from estimated pose 331 to estimated poses 324 and 325, respectively. Thus, in the illustrated example, the spatially smoothed pose estimator 235 updates the estimated pose of the device, as reflected by the visualization frame 240, relatively frequently based on the pose information provided by the IMU 230 at a relatively high rate. Less frequently, the spatially smoothed pose estimator 235 spatially smoothes the visualization frame 240 by attracting the frame 240 to the estimator frame 241, as the estimator frame 241 is updated at a relatively low rate by the image-based pose estimator 232. The spatially smoothed pose estimator 235 thereby updates the estimated pose of the device frequently while still maintaining high accuracy of the estimated pose.

Figure 4:
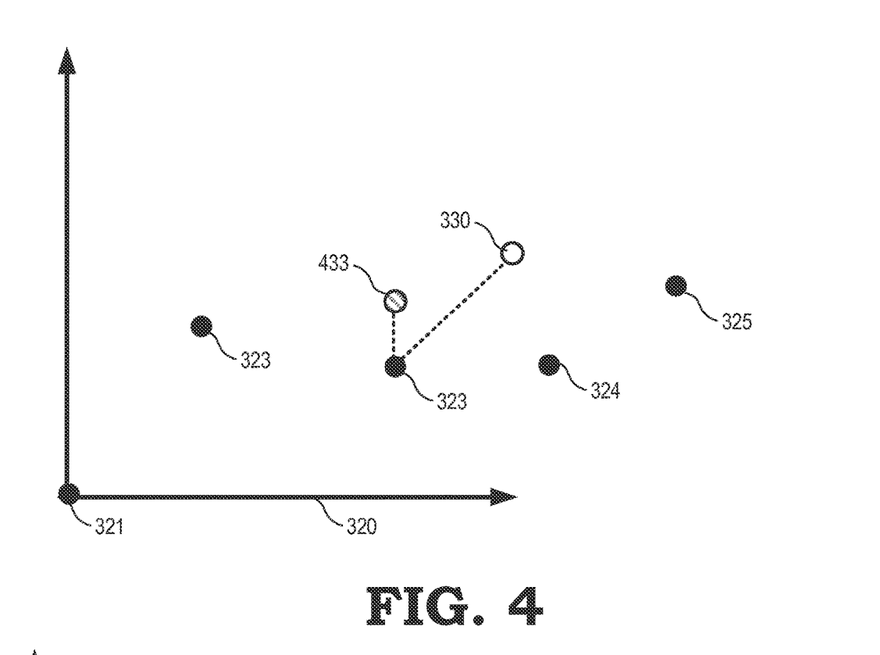
FIG. 4 is a diagram illustrating spatial smoothing of a set of estimated poses along a selected axis in accordance with at least one embodiment of the present disclosure.

In at least one embodiment, the spatially smoothed pose estimator 235 attracts the visualization frame 240 to the estimator frame 241 along only a subset, rather than all, of the axes of the frame of reference 320. An example is illustrated at FIG. 4, which depicts attracting the visualization frame 240 to the estimator frame 241 along the Y axis of the frame of reference 320 in accordance with at least one embodiment of the present disclosure. In the illustrated example, when the visualization frame 240 reflects estimated pose 323, and estimator frame 241 reflects estimated pose 330, the spatially smoothed pose estimator 235 attracts the visualization frame 240 to the estimator frame 241 along the Y axis only, so that the visualization frame 240 reflects estimated pose 433. In the embodiment of FIG. 4, the visualization frame 240 is not snapped to the estimator frame 241 along the Y axis, but is scaled along that axis. By attracting the visualization frame 240 to the estimator frame 241 along only a subset, rather than all, of the axes of the frame of reference 320, the spatially smoothed pose estimator 235 lowers processing overhead so that attraction can be effectuated quickly thereby providing a better user-experience with the location-based functionality of the electronic device 100.

Figure 5:
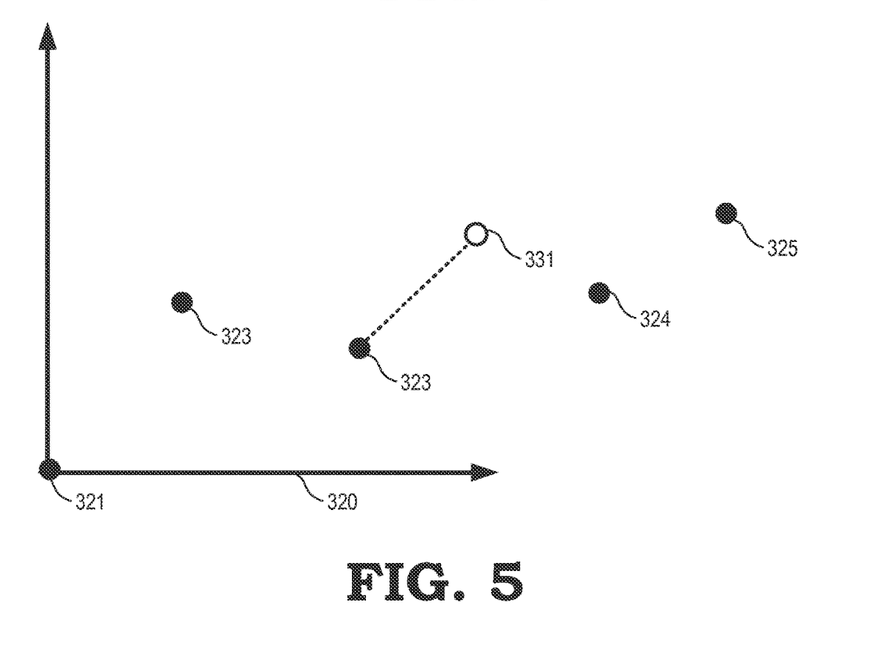
FIG. 5 is a diagram illustrating spatial smoothing of a set of estimated poses by snapping an estimated pose based on non-image sensor data to a corresponding estimated pose based on image sensor data.

In at least one embodiment, illustrated at FIG. 5 the spatially smoothed pose estimator 235 attracts the visualization frame 240 to the estimator frame 241 by snapping the frame 240 to the frame 241. In the illustrated example, when the visualization frame 240 reflects estimated pose 323, and estimator frame 241 reflects estimated pose 330, the spatially smoothed pose estimator 235 attracts the visualization frame 240 to the estimator frame 241 by snapping the frames, so that the values of the visualization frame 240 reflecting the estimated pose in the frame of reference 320 are set as equivalent to corresponding values of the estimator frame 241. Thus, after the visualization frame 240 has been attracted to the estimator frame 241, the visualization frame 240 corresponds to estimated pose 331. Snapping the visualization frame 240 to the estimator frame 241 improves the accuracy of the estimated pose reflected by the visualization frame 240, and therefore provides a better user experience for at least some of the location-based functionality of the electronic device 100.

Figure 6:
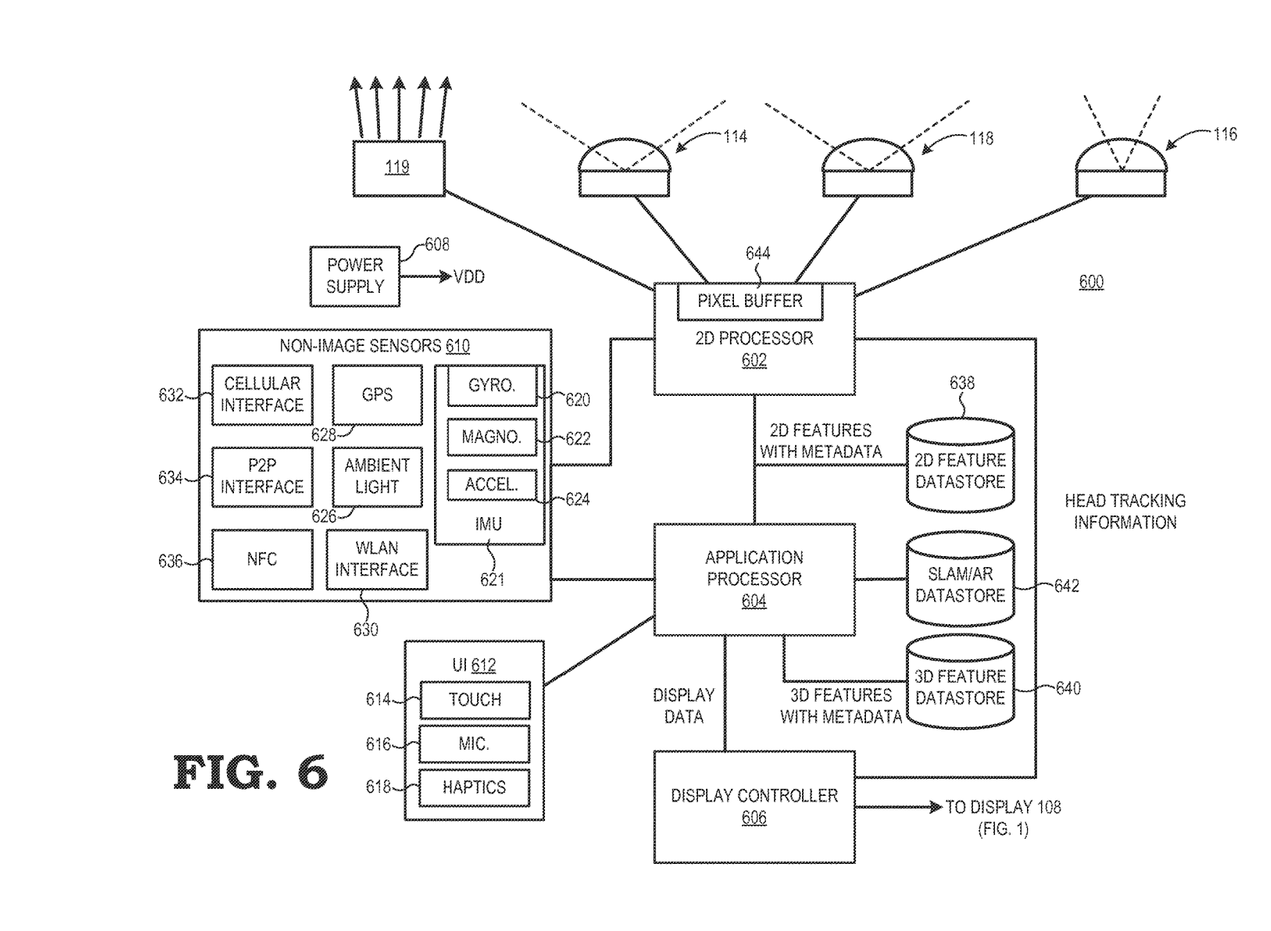
FIG. 6 is a block diagram illustrating a processing system of an electronic device for spatially smoothing estimated poses of the electronic device in accordance with at least one embodiment of the present disclosure.

FIG. 6 illustrates an example processing system 600 implemented by the electronic device 100 in accordance with at least one embodiment of the present disclosure. The processing system 600 includes the wide-angle imaging camera 114, the narrow-angle imaging camera 116, the user-facing imaging camera 118, and the depth sensor 120. The processing system 600 further includes a 2D processor 602, an application processor 604, a display controller 606, a power supply 608, a set 610 of non-image sensors, and a user interface 612.

In a portable user device implementation, such as a tablet computer or smartphone implementation, the power supply 608 can include a battery, solar array, or other portable power source used to power the electrical components of the electronic device. The user interface 612 includes one or more components manipulated by the user to provide user input to the electronic device 100, such as a touchscreen 614, a mouse, a keyboard, a microphone 616, various buttons or switches, and various haptic actuators 618. The set 610 of non-image sensors can include any of a variety of sensors used to provide non-image context or state of the electronic device 100. Examples of such sensors include an IMU including a gyroscope 620, a magnetometer 622, and an accelerometer 624, and an ambient light sensor 626. The non-image sensors further can include various wireless reception or transmission based sensors, such as a GPS receiver 628, a wireless local area network (WLAN) interface 630, a cellular interface 632, a peer-to-peer (P2P) wireless interface 634, and a near field communications (NFC) interface 636. The non-image sensors also can include user input components of the user interface 612, such as the touchscreen 614 or the microphone 616.

The electronic device 100 further has access to various datastores storing information or metadata used in conjunction with its image processing, location mapping, and location-utilization processes. These datastores can include a 2D feature datastore 638 to store metadata for 2D spatial features identified from imagery captured by the imaging cameras of the electronic device 100 and a 3D spatial feature datastore 640 to store metadata for 3D features identified from depth sensing for the 2D spatial features using analysis or modulated light-based depth sensing. The metadata stored for the 2D and 3D features can include, for example, timestamps for synchronization purposes, image identifiers of the images in which the spatial features were identified, identifiers of the capture device used, calibration information, and the like. This metadata further can include non-image sensor data that was contemporaneously with the image containing the identified spatial feature, such as GPS, wifi, or other radio information, time-of-day information, weather condition information (which affects the lighting), and the like. The datastores further can include a SLAM/AR datastore 642 that stores SLAM-based information, such as mapping information for areas of the local environment 112 (FIG. 1) already explored by the electronic device 100, or AR information, such as CAD-based representations of the relative locations of objects of interest in the local environment 112. The datastores 638 and 640 can also store known feature descriptors and feature descriptors generated based on imagery captured at the electronic device 100. The datastores may be local to the electronic device 100, such as on a hard drive, solid state memory, or removable storage medium (not shown), the datastores may be remotely located and accessible via, for example, one or more of the wireless interfaces of the electronic device 100, or the datastores may be implemented as a combination of local and remote data storage.

In the depicted implementation, the processing system 600 employs two processors: the 2D processor 602 configured to efficiently identify 2D spatial features from visible-light imagery and depth sensor imagery captured by the imaging cameras of the electronic device 100; and the application processor 604 configured to efficiently identify 3D spatial features from the 2D spatial features and to efficiently provide location-based functionality, such as visual odometry or other SLAM functionality, AR functionality, and the like. However, in other embodiments, the described functionality of the 2D processor 602 and the application processor 604 may be implemented in a single processor, or more than two processors together may implement the described functionality. The 2D processor 602 can be implemented as, for example, a single-core or multiple-core graphics processing unit (GPU) and the application processor 604 can be implemented as, for example, a GPU or a single-core or multiple-core central processing unit (CPU).

The 2D processor 602 is coupled to the wide-angle imaging camera 114, the narrow-angle imaging camera 116, and the user-facing imaging camera 118 so as to receive image data captured by the imaging cameras in one or more pixel row buffers 644. In one embodiment, the 2D processor 602 includes an interface and a pixel row buffer 644 for each imaging camera so as to be able to receive image data from each imaging camera in parallel. In another embodiment, the 2D processor 602 includes a single interface and a pixel row buffer 644 and thus the 2D processor 602 multiplexes between the imaging cameras.

The 2D processor 602 is configured to process the captured image data from the imaging cameras to identify 2D spatial features present in the image data. In some embodiments, the 2D processor 602 implements a hardware configuration specifically designed for this task. In other embodiments, the 2D processor 602 includes a more general processor architecture that provides the 2D spatial feature detection through execution of a software program configured to implement the 2D spatial feature detection process. The 2D processor 602 also may implement a combination of specialized hardware and specialized software for this purpose. As described above, any of a variety of well-known 2D spatial feature detection or extraction algorithms may be implemented by the 2D processor 602. The 2D processor 602 stores metadata and other information pertaining to the identified 2D spatial features to the 2D feature datastore 638.

The 2D processor 602, in one embodiment, is configured to implement the image-based pose estimator 232 to analyze imagery captured by the user-facing imaging camera 118 to track the current pose (e.g., the current location) of the user's head using any of a variety of well-known head tracking algorithms. In the depicted example, the 2D processor 602 provides the head tracking information to the display controller 606, which in turn is configured to adjust the displayed imagery to react to changes in the user's view perspective as reflected in changes in pose of the user's head. In another embodiment, the 2D processor 602 provides the head tracking information to the application processor 604, which in turn modifies the display data to reflect updated view perspectives before the display data is provided to the display controller 606.

The 2D processor 602 also acts as a controller that operates the modulated light projector 119 in its use in determining depth data for spatial features identified in the captured imagery of the local environment 112. In certain conditions, such as relatively bright settings (as sensed using the ambient light sensor 626), the 2D processor 602 may use image analysis of imagery concurrently captured by the wide-angle imaging camera 114 and the narrow-angle imaging camera 116 to determine depth data for spatial features present in the captured imagery. In other conditions, such as relatively low lighting conditions, the 2D processor 602 may switch to the use of the depth sensor 120 (FIG. 1) to determine this depth data. In other embodiments, the processing system 600 implements a controller (not shown) separate from the 2D processor 602 to control the operation of the modulated light projector 119.

As described above, the depth sensor 120 relies on the projection of a modulated light pattern by the modulated light projector 119 into the local environment and on the capture of the reflection of the modulated light pattern therefrom by one or more of the imaging cameras. Thus, the 2D processor 602 may use one or both of the forward-facing imaging cameras 114 and 116 to capture the reflection of a projection of the modulated light pattern and process the resulting imagery of the reflected modulated light pattern to determine the depths of corresponding spatial features represented in the reflected modulated light pattern. To match a depth reading with a corresponding 2D spatial feature, the 2D processor 602 can perform a 2D spatial feature analysis on the depth imagery to determine a 2D spatial feature and its relative depth, and then attempt to match the 2D spatial feature to a corresponding spatial feature identified in the visual-light imagery captured at or near the same time as the reflected modulated light imagery was captured. In another embodiment, the 2D processor 602 can capture a visible-light image, and quickly thereafter control the modulated light projector 119 to project a modulated light pattern and capture a reflected modulated light image. The 2D processor 602 then can develop a depth map for the visible-light image from the reflected modulated light image as they effectively represent the same scene with the same spatial features at the same coordinates due to the contemporaneous capture of the visible-light image and the reflected modulated light image.

The application processor 604 is configured to identify spatial features represented in the captured imagery using the 2D spatial features represented in the 2D feature datastore 638 and using non-image sensor information from the set 610 of non-image sensors. As with the 2D processor 602, the application processor 604 may be configured to perform this process through a specialized hardware configuration, through execution of software configured for this process, or a combination of specialized hardware and software. Metadata and other information for the identified 3D spatial features are stored in the 3D feature datastore 640. In at least one embodiment, the application processor 604 implements (e.g., executes instructions that, when executed, manipulate the application processor 604 to perform the operations of) the spatially smoothed pose estimator 235 (FIG. 2). Thus, the application processor 604 can generate the visualization frame 240 and update the frame based on non-visual position information received from the set 610 of non-image sensors (e.g., the non-image sensors of the IMU 230) at a relatively fast rate. In addition, the application processor 604 can generate and update, at a relatively slow rate the estimator frame 241 based on the estimated pose indicated by the identified spatial features, and can periodically attract the visualization frame 240 to the estimator frame 241 as described above.

The application processor 604 further is configured to provide SLAM, AR, VR, and other location-based functionality using 3D spatial features represented in the 3D feature datastore 640 and using the current context of the electronic device 100 as represented by non-image sensor data. The current context can include explicit or implicit user input obtained from, for example, the user interface 612 or via an analysis of user interactions. This functionality can include determining the current relative pose of the electronic device 100 based on the visualization frame 240. Similarly, the application processor 604 can use a history of positions/orientations of the electronic device 100 and a history of spatial features observed in those positions/orientations to create a map of the local environment 112.

The location-based functionality provided by the application processor 604 further can include AR-related or VR-related functionality that includes identifying and accessing from the SLAM/AR datastore 642 graphical information to be provided as a graphical overlay on the display 108 based on the current pose determined by the application processor 604. This graphical overlay can be provided in association with imagery captured by the imaging cameras in the current pose for display at the display 108 via the display controller 606. The display controller 606 operates to control the display 108 (FIG. 1) to display imagery represented by display data received from the application processor 604. Further, in some embodiments, the display controller 606 can receive head tracking information from the 2D processor 602 and adjust the view perspective of the imagery being displayed based on the user head position or eye position represented in the received head tracking information.

Figure 7:
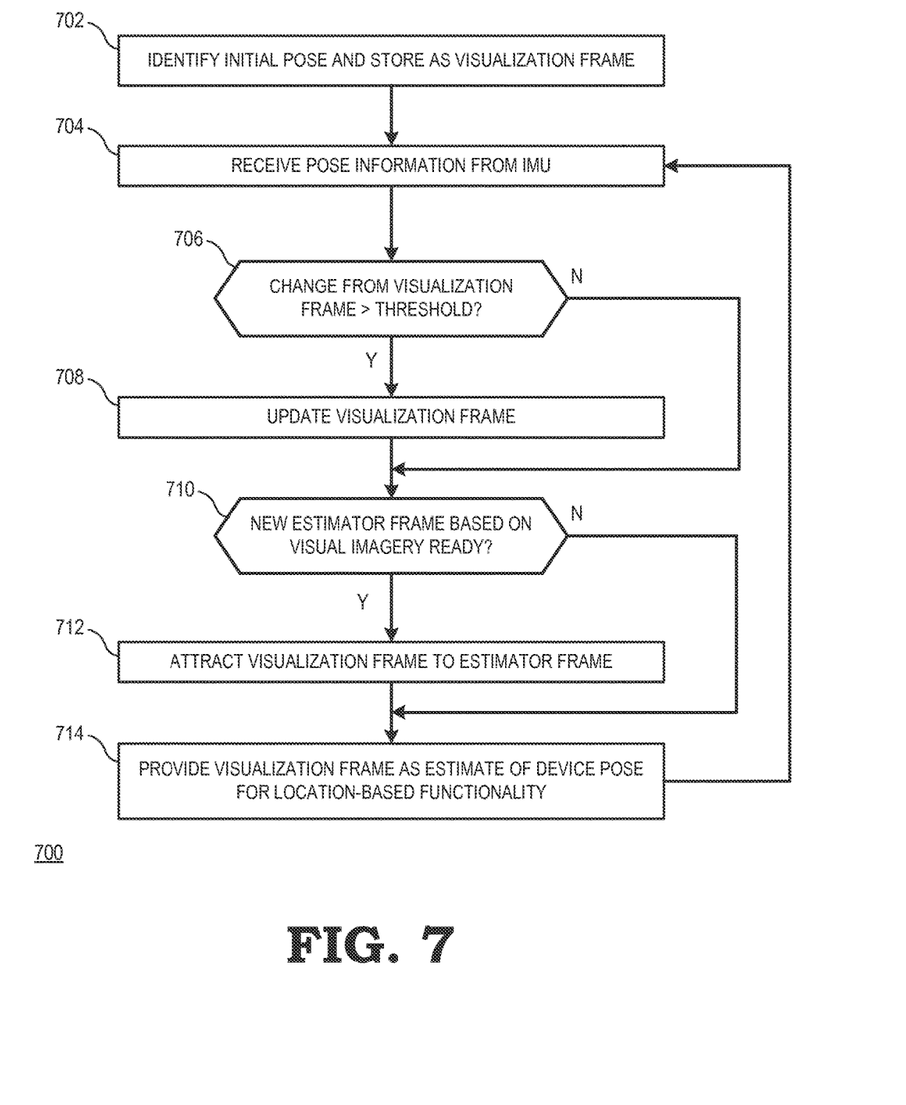
FIG. 7 is a flow diagram illustrating an operation of an electronic device to spatially smooth a set of estimated poses of the electronic device based on image sensor data and non-image sensor data in accordance with at least one embodiment of the present disclosure.

FIG. 7 illustrates a flow diagram of a method 700 of estimating a pose of an electronic device in accordance with at least one embodiment of the present disclosure. For purposes of description, the method 700 is described with respect to an example implementation at the electronic device 100 of FIGS. 1-6. At block 702, in response to a reset or other initialization event, the electronic device 100 identifies an initial device pose based on one or more of map data provided by a geolocation device such as a GPS device, features identified from imagery captured at the electronic device 100, and non-image-based position information provided by the IMU 230. The spatially smoothed pose estimator 235 (FIG. 2) sets the initial state of the visualization frame 240 to reflect this initial device pose. At block 704, the spatially smoothed pose estimator 235 receives pose information from the IMU 230. The information is received at a relatively high rate, such as one to two kHz. At block 706, spatially smoothed pose estimator 235 compares the received position data to the visualization frame 240, and identifies whether the differences between the received position data and the visualization frame 240 exceed a threshold value. If not, the spatially smoothed pose estimator 235 determines that the electronic device 240 has not moved since the previous position data was received, and the method flow moves to block 710, described below.

Returning to block 706, if the differences between the received position data and the visualization frame 240 exceed the threshold value, the spatially smoothed pose estimator 235 determines that the electronic device 100 has moved to a new pose. Accordingly, the method flow proceeds to block 708 and the spatially smoothed pose estimator 235 updates the visualization frame, based on the pose information received from the IMU 230, to reflect the new pose. The method flow proceeds to block 710 and the spatially smoothed pose estimator 235 identifies whether the image-based pose estimator 232 has updated the estimator frame 241 based on features identified from captured imagery. These updates to the estimator frame 241 occur at a relatively low rate, such as less than 10 Hz. If the estimator frame 241 has not been updated, the spatially smoothed pose estimator 235 refrains from attracting the visualization frame 240 to the estimator frame 241 and the method flow moves to block 714, described below.

Returning to block 710, if the image-based pose estimator 235 has updated the estimator frame 241, the method flow moves to block 712 and the spatially smoothed pose estimator 235 attracts the visualization frame 240 to the estimator frame 241, as described above. The method flow proceeds to block 714 and the electronic device 100 employs the estimated pose indicated by the visualization frame for location-based functionality, such as supporting one or more VR or AR applications. The method flow returns to block 704, and the electronic device 100 continues to update the visualization frame 240 and estimator frame 241 over time as the pose of the electronic device 100 changes over time.

Much of the inventive functionality and many of the inventive principles described above are well suited for implementation with or in software programs or instructions and integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the preferred embodiments.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
    updating, at an electronic device, a first data structure storing a first estimated pose of the electronic device at a first rate based on received non-visual pose information obtained from non-visual sensors;
    updating, at the electronic device, a second data structure storing a second estimated pose of the electronic device at a second rate based on imagery captured at the electronic device, the second rate lower than the first rate;
    adjusting the first data structure to match the second data structure, comprising:
        identifying a difference between the first estimated pose and the second estimated pose along a first axis of a frame of reference of the electronic device;
        adjusting the first estimated pose along the first axis within a first threshold amount based on the difference between the first estimated pose and the second estimated pose, and,
        in response to identifying that the difference exceeds a second threshold, setting the difference to the second threshold; and
    employing the adjusted first data structure as an estimated pose of the electronic device to support location-based functionality at the electronic device.

2. The method of claim 1, wherein adjusting the first data structure to match the second data structure comprises:
    adjusting the first estimated pose along each of a plurality of axes of the frame of reference based on the difference between the first estimated pose and the second estimated pose.

3. The method of claim 1 wherein adjusting the first estimated pose along the first axis comprises:
    scaling the first estimated pose along the first axis based on the difference.

4. The method of claim 1, wherein adjusting the first estimated pose along the first axis comprises:
    setting a value of the first estimated pose along the first axis to a corresponding value of the second estimated pose.

5. The method of claim 1, wherein adjusting the first estimated pose along the first axis comprises:
    selecting the first axis based on a degree of motion along the first axis indicated by the difference between the first estimated pose and the second estimated pose.

6. The method of claim 1, wherein adjusting the first estimated pose along the first axis comprises:
    selecting the first axis based upon a predicted likelihood that pose errors along the first axis will be perceived by a user of the electronic device.

7. The method of claim 1, wherein updating the first data structure based on received non-visual pose information comprises:
    identifying a third estimated pose of the electronic device based on the received non-visual pose information; and
    in response to determining that a difference between the first estimated pose and the third estimated pose is below a threshold, refraining from modifying the first estimated pose.

8. The method of claim 1, wherein updating the second data structure based on imagery comprises:
    identifying a third estimated pose of the electronic device based on the imagery captured at the electronic device and based on non-visual pose information;
    identifying a difference between the third estimated pose and the second estimated pose along a first axis of a frame of reference of the electronic device; and
    adjusting the second estimated pose along the first axis based on the difference between the third estimated pose and the second estimated pose.

9. A method, comprising,
    updating at an electronic device a first set of estimated poses at a first rate based on non-visual pose information obtained from non-image sensors;
    updating a second set of estimated poses at a second rate lower than the first rate based on imagery captured at the electronic device; and
    spatially smoothing, at the electronic device, the first set of estimated poses based on the second set of estimated poses, wherein spatially smoothing is within a first threshold amount and comprises:
        scaling the first set of estimated poses based on a difference between the first set of estimated poses and the second set of estimated poses, and,
        in response to identifying that the difference exceeds a second threshold, setting the difference to the second threshold.

10. The method of claim 9, wherein the first rate is at least five times the second rate.

11. The method of claim 9, further comprising:
    updating the second set of estimated poses based on the imagery and based on geolocation data received at the electronic device.

12. An electronic device comprising:
an imaging camera to capture imagery;
an inertial measurement unit (IMU) to generate non-visual pose information; and
a processor to
- update a first data structure storing a first estimated pose of the electronic device at a first rate based on the imagery;
- update a second data structure storing a second estimated pose of the electronic device at a second rate based on received non-visual pose information obtained from non-image sensors, the second rate higher than the first rate; and
- adjust, within a first threshold amount, the second data structure to match the first data structure, wherein the processor is to adjust the second data structure to match the first data structure by:
  - identifying a difference between the first estimated pose and the second estimated pose along a first axis of a frame of reference of the electronic device;
  - adjusting the first estimated pose along the first axis based on the difference between the first estimated pose and the second estimated pose; and
  - in response to identifying that the difference exceeds a second threshold, setting the difference to the second threshold.

13. The electronic device of claim 12, wherein the processor is to adjust the second data structure to match the first data structure by:
- adjusting the second data structure along each of a plurality of axes of the frame of reference based on the difference between the first data structure and the second data structure.

14. The electronic device of claim 12, wherein the processor is to adjust the second data structure to match the first data structure by:
- scaling the second data structure along the first axis based on the difference.

15. The electronic device of claim 12, wherein the processor is to adjust the second data structure along the first axis by:
- setting a value of the second data structure along the first axis to a corresponding value of the first data structure.

16. The electronic device of claim 12, wherein the processor is to adjust the second data structure along the first axis by:
- selecting the first axis based on a degree of motion along the first axis indicated by the difference between the first data structure and the second data structure.

* * * * *